Feb. 5, 1935.   C. G. KRANZ   1,989,757
RESILIENT TIRE
Filed June 11, 1934
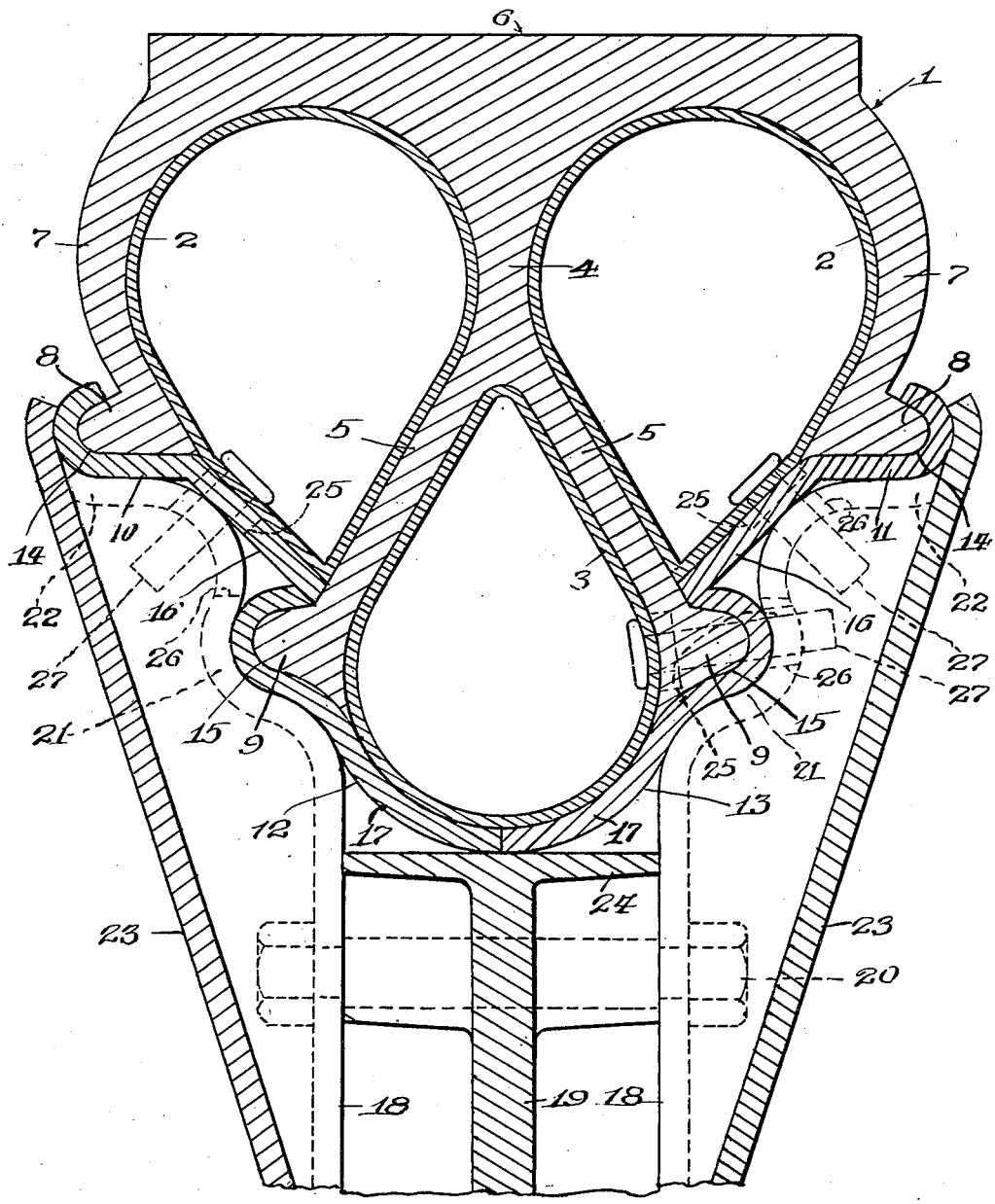
INVENTOR.
Curtis George Kranz Patented Feb. 5, 1935

1,989,757

UNITED STATES PATENT OFFICE 1,989,757

RESILIENT TIRE

Curtis George Kranz, Chicago, Ill.

Application June 11, 1934, Serial No. 729,968

3 Claims. (Cl. 152—22)

This invention relates to resilient tires, and more particularly to tires which employ a plurality of pneumatic or inflated tubes housed within a tire casing. Among the objects of this invention are to increase the efficiency of tires, to attain a high degree of resiliency without the usual kneading of the usual solid portions thereof and to provide a plural tube tire which is simple in construction and comparatively easy to assemble and apply to the rim of a vehicle wheel.

Another object is to provide a plural tube tire having relatively thin casing walls spacing the pneumatic tubes apart and disposed at angles to a vertical line whereby when the tire is subjected to bumps and jars, as well as under normal conditions, said inclined walls may yield and bow towards a pneumatic tube instead of being kneaded, thereby minimizing the wear on solid parts and lengthening the life of the tire.

Other objects and advantages will occur in the course of this specification and with said objects and advantages in view, this invention consists in the several novel features of construction, arrangement and combination of parts hereinafter described and claimed.

The invention is clearly illustrated in the accompanying drawing, in which the Figure is a vertical cross-section through a tire embodying a simple form of the invention, showing the same applied to a fragment of a vehicle wheel.

The tire is particularly adapted for heavy duty purposes, such as use on motor trucks, busses and the like, although it is equally serviceable on lighter vehicles such as passenger automobiles and other light vehicles.

In its preferred form the tire comprises a casing 1, and a plurality of pneumatic or inflatable tubes 2, 2, 3, separated from each other by a middle casing wall 4, which has two branch walls 5, 5, that diverge from the inner end of the middle wall 4 and overlies the tube 3. The tubes 2, 2 are disposed side by side under the tread portion 6 of the casing, the outer surface of which is cylindrical or substantially cylindrical, and the tube 3, is disposed in the medium plane of the tire, between the two tubes 2, 2, and the rim of the wheel.

The cavities in the casing which receive the tubes are substantially pear shaped in cross-section, the apexes of the two outer cavities being directed toward the axis of the wheel, and the apex of the inner cavity being directed toward the tread of the casing. This disposition and shape of the cavities provides the tread portion, the middle and diverging walls and two side walls 7, 7. On the annular free edges of the side walls and diverging walls are beads 8, 9, of the ordinary form for anchoring the casing to the rim. The casing is composed of the usual fabric and rubber common in ordinary tire casings.

The rim is shaped to conform to the shape of the inner face of the casing and tubes, and is composed of sections 10, 11, 12, 13. The rim sections 10, 11, are formed with annular grooves 14, to receive the beads 8, and the rim sections 12, 13 are formed with annular grooves 15 to receive the beads 9. The rim sections 10, 11 have parts 16, each in the form of a frustum of a cone that extend from the grooved portions thereof to the grooved portions of the rim sections 12, 13 and provide seating faces between the beads 8 of the side walls 7, and the beads 9 of the diverging walls 5, 5, thus completing the walls for the cavities in which the outer tubes are contained. From the grooved portions of the rim sections 12, 13, the latter are formed with reverse curved bends 17, which provide an annular groove to receive the inner side of the inner tube. Obviously the rim sections on each side of the wheel could be made in one piece, but for the purposes of illustration, they are shown as made in two pieces.

The sides 18, 18 of the wheel are of disc like formation, bolted upon a central hub body 19, by bolts, one of which is shown at 20. Bosses are formed on the hub body to receive the bolts. The marginal portions of the sides 18, 18, are dished outwardly at 21, and 22 to provide channels or grooves to receive the grooved portions 14, 15 of the rim sections. The sides 18, 18 are also struck outwardly at equidistant places along radial lines to provide strengthening ribs 23. The hub body 19 has an annular flange 24 which spaces the two sides 18, 18 apart.

Aperture 25 is provided in the rim sections 10, 11 and 13 and apertures 26 in the sides 18 for the reception of the valves 27 with which the tubes are equipped as usual.

To remove and replace the tubes, one side 18 is unbolted and withdrawn, and the two rim sections, disposed at that side, are removed from the tire, which can then be removed as a unit, thereby giving access to all of the tubes, any or all of which may be removed and replaced.

To avoid pinching the inner tube 3 between the rim sections 12, 13, the normal inner diameter of the tube is preferably made a trifle greater than the external diameter of the bottom of the annular groove formed by the rim sections 12, 13. To replace the tire upon the wheel the operations just described are reversed.

When the tubes are properly inflated, they conform to the inner contours of the cavities in the casing, the pressure in the outer tubes counterbalancing the pressure in the inner tube so that the diverging walls 5 assume the inclined positions shown. It will be observed that the disposition of the beads is such that the pressure tends to positively anchor them in the grooves in the rim sections. Violent external pressure applied to the tread of the casing, such as is occasioned by traveling over rough roads, causes the diverging walls to bow slightly, but since there is no substantially thick body of solid matter under the outer tubes, there is no body portion which is likely to be kneaded due to the continuous changing of the position of the substance of which the body is composed.

With the present construction a straight across wide face tread is obtainable without the necessity of widening the hub. Furthermore, in case one of the outer tubes is punctured, the remaining inflated tubes will enable the tire to be used for a short run.

I claim as new and desire to secure by Letters Patent:

1. In a resilient tire, a tire casing comprising a substantially straight across tread portion, outer side walls provided with anchoring means adapted to seat in grooves in a tire rim, and a middle inner wall projecting inward from the tread portion of the casing and terminating in two diverging wall portions that are provided with anchoring means adapted to seat in grooves in the rim that are disposed laterally and radially inward from the first mentioned grooves, said walls and rim providing two chambers adjacent the tread portion and an intermediate chamber disposed nearer the axis of the tire than the other two chambers, and separate inflatable tubes in said chambers serving to seat the anchoring means in the grooves.

2. In a resilient tire, a tire casing comprising a straight across tread portion, outer side walls and an inner wall terminating in two diverging tube spacing walls, the free edges of the diverging walls being disposed laterally and radially inward from the free edges of the outer side walls, and all of said free edges being formed with anchoring means.

3. In a resilient tire, a casing comprising a tread portion, outer side walls, and a middle wall which terminates in two diverging branch walls, the free edges of which are disposed laterally and radially inward from the free edges of the outer side walls, the free edges of all of said walls having anchoring means engaging in grooves in a rim which has seating faces opposing the diverging casing walls to connect the edges of the outer walls with the edges of the diverging walls and to connect the edges of the diverging walls, whereby to form outer and intermediate chambers for receiving inflatable tubes.

CURTIS GEORGE KRANZ.